Jan. 8, 1952 C. M. THEILLAUMAS 2,581,457
ELECTRONIC STOP CIRCUIT FOR SWITCHES
Filed April 10, 1946
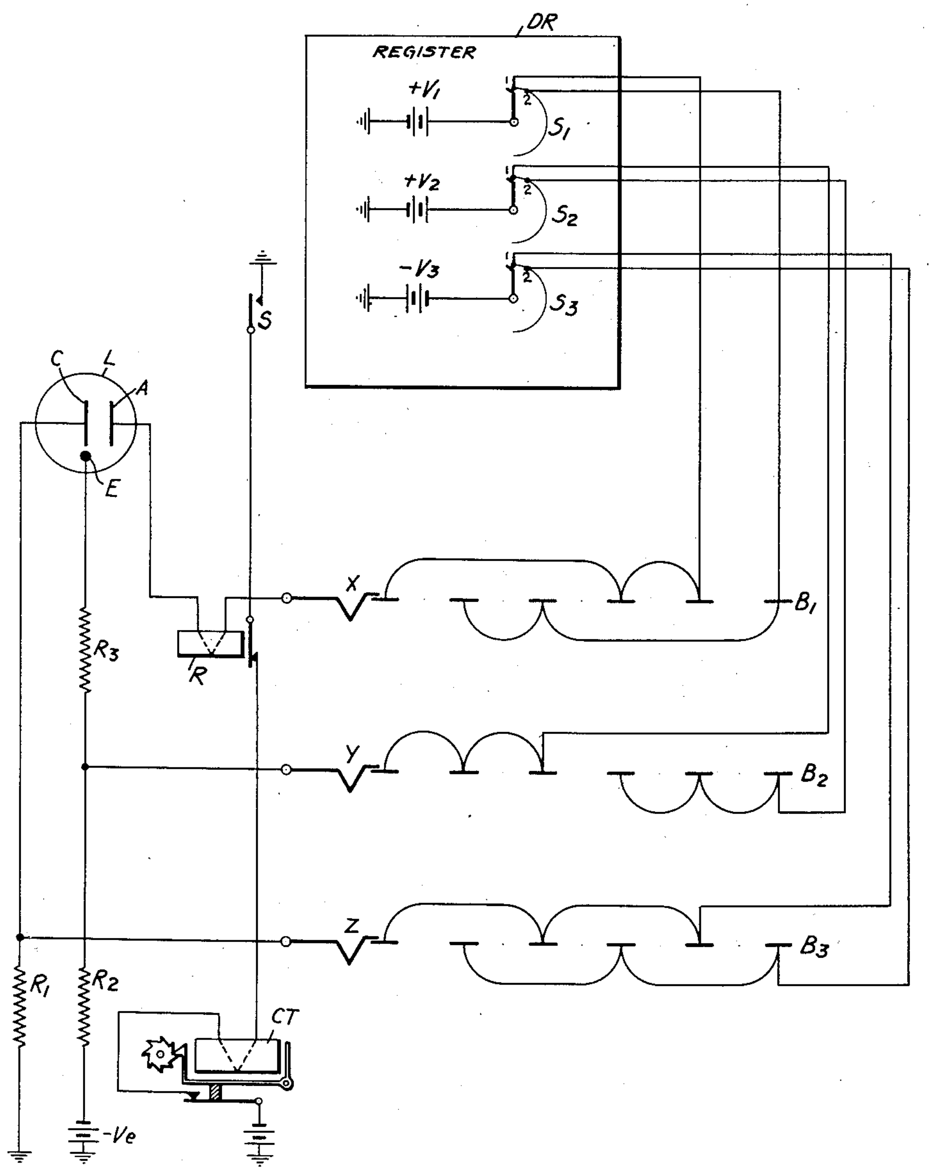
INVENTOR
CLEMENT M. THEILLAUMAS
BY Robert Harding Jr.
ATTORNEY Patented Jan. 8, 1952 2,581,457

UNITED STATES PATENT OFFICE 2,581,457

ELECTRONIC STOP CIRCUIT FOR SWITCHES

Clement M. Theillaumas, Seine, France, assignor to International Standard Electric Corporation, New York, N. Y., a corporation of Delaware Application April 10, 1946, Serial No. 661,015
In France June 15, 1942

Section 1, Public Law 690, August 8, 1946
Patent expires June 15, 1962

6 Claims. (Cl. 179—18)

This invention relates to electrical control circuits and particularly to the use of electronic devices for controlling electrical circuits and apparatus, for instance in telephone or other switching systems.

Objects of the invention are the provision of more accurate and dependable electrical control circuits and devices and an increase in the flexibility of, and field of application for, such circuits and devices.

This invention is a method and means for electronically controlling electrical circuits and devices in which a particular combination of a plurality of different electrical conditions or characteristics effects a desired control operation.

The register DR is shown in the drawing having three step-by-step switches S1, S2, and S3. It will be understood that these switches represent, respectively, the first, second, and third digits of a code which is transmitted to the register and are set in some suitable manner to correspond to the digit code transmitted. In the example shown, the first, fourth and fifth contacts of level B1 are connected to a first contact in a group of contacts of the switch S1, while the second, third and sixth contacts of this level are connected to a second terminal in the switch S1. The wiper of switch S1 is connected to the positive side of a battery having a voltage of +V1, while the negative side of the battery is connected to ground. When the switch S1 is on contact 1, the potential will be connected to the first, third and fourth contacts of level B1, and when it is on the second terminal, this potential will be connected to the contacts 2, 3 and 6 of the same level.

In a similar manner switch S2 is provided with two terminals the first being connected to contacts 1, 2 and 3 of the level B2 while the second is connected to contacts 4, 5 and 6 of the same level. The wiper of switch S2 is connected to the positive side of a battery having a potential +V2, the negative side of the battery being connected to ground. When the wiper of switch S2 is on the first terminal, contacts 1, 2 and 3 of level B2 are given the potential +V2, and when the switch is on the second terminal, the contacts 4, 5 and 6 of the same level are given that same potential.

In a similar manner switch S3 is provided with two terminals the first of which is shown connected to contacts 1, 3 and 5 of the B3 level while the second terminal of the switch is connected to contacts 2, 4 and 6 of the same level. The wiper of switch S3 is connected to the negative terminal of a battery having a voltage of —V3 while the positive terminal is connected to ground. When the wiper of the switch S3 is on the first terminal, contacts 1, 2 and 3 of level B3 have the negative potential —V3, and when the wiper of the switch is on the second terminal, contacts 2, 4 and 6 of level B3 have that potential.

A feature of the invention is a control arrangement or method in which an electronic or ionic discharge device is employed in establishing a desired control, or in effecting the operation of a controlled device, responsive to the application of a particular combination of voltage conditions to the various electrodes of the discharge device.

According to one feature of the invention, each of the electrodes of an electronic or ionic device is successively connected to elements each of which is subjected to varying voltage conditions, the discharge device and a controlled device connected to one of these electrodes being operatively responsive to a particular combination of voltage conditions applied simultaneously to the various electrodes.

The application of the invention in a telephone switching system is illustrated in the drawing which consists of a single figure. The invention is not limited to the particular arrangement shown and is capable of a large number and variety of applications in electrical control circuits.

The drawing shows, schematically, a translator switch in an automatic telephone system comprising a large number of offices. The switch comprises a set of three brushes X, Y and Z and a terminal bank, each brush adapted to engage the terminals in one of the levels B1, B2, B3. The switch further comprises a driving magnet CT and a relay R for stopping the advance of the switch when the desired position is reached. In such a system, each office may be assigned a three digit code; and the translator switch has a different setting for each such code. In case the number of office codes exceeds the capacity of a single translator switch, two or more such switches may be employed to provide one position for each code.

In order to effect the completion of a connection between a calling and the called lines on a particular telephone call, it is necessary that the translator switch be advanced to the particular position corresponding to the called office code. Each of the three digits of the called office code is registered on a digit register, for instance, a register comprising a step-by-step switch or a chain of relays. Each digit register effects the connection of a desired voltage to certain terminals in one of the levels of the hunting bank of the translator. That is the terminals in level B1 are marked according to the first digit; the terminals in level B2 are marked according to the second digit; and the terminals in the level B3 are marked according to the third digit of the office code. The starting of the translator switch is effected, when all three digits of the called office code have been registered, by closure of the operating circuit for the driving magnet CT under control of a starting switch S which may be operated after all three of the switches S1, S2 and S3 have been set. The switch may be stopped in the desired position, corresponding to the called office code, by the operation of three relays, one for each level, the simultaneous operation of all three relays occurring only when the desired position is reached. But such an arrangement is not satisfactory since the relays may not be fast enough to insure stopping in the desired position; and furthermore, there is considerable sparking as the wipers advance over the contacts due to the operation of one or two but not all three of the relays.

This invention overcomes the disadvantages of the aforementioned relay control arrangement for stopping the switch in desired position. As shown in the drawing, the circuit for the driving magnet CT is placed under the control of a single relay R, whose winding is connected in series with the anode A of the electronic tube L and the wiper X. The control electrode E of tube L is connected to wiper Y and also through resistor R2 to the negative po'e of a battery. The cathode C of tube L is connected to wiper Z and also through resistor R1 to ground potential. Thus normally, the tube L and relay R will be deenergized. When the called office code has been registered, a positive voltage V1 will be connected to one or more of the terminals in level B1 corresponding to the first digit; a positive voltage V2 will be connected to one or more of the terminals in level B2 corresponding to the second digit; and a negative voltage V3 will be connected to one or more of the terminals in level B3 corresponding to the third digit of the called office code. In the drawing, the V1 voltage is connected to the second, third and last terminals of level B1; the V2 voltage is connected to the first, second, third and last terminals of level B2; and the V3 voltage is connected to the first and third terminals of level B3. The position corresponding to the particular code, assumed in the voltage marking shown, is the third position, this being the only position in which the required voltage is present on the three terminals engaged by wipers X, Y and Z. The driving magnet CT will be energized and the translator wipers are advanced. When the third position, corresponding to the called office code, is reached, the tube L will be energized and relay R will be operated to stop the translator switch. The energization of the tube L and operation of relay R is thus effected in one position only, that being the position corresponding to the called office code. For each other office code, the translator switch will be stopped in a different position, in like manner.

It is clear that such a circuit may find advantageous applications at numerous points of switching circuits. It is likewise clear that it is not limited to the specific arrangement shown and described, but is, on the contrary, capable of numerous modifications and adaptations without departing from the scope of the invention— in particular, a tube having more than three electrodes may be used in accordance with the method provided by the invention.

What is claimed is:

1. A telephone switching arrangement for controlling a circuit comprising a plurality of sources of different, fixed electric potentials, an electron discharge tube having a plurality of electrodes, said tube being capable of conducting upon application of a predetermined combination of potentials to the electrodes thereof, a plurality of potential hunting devices, each connected to a different one of the electrodes of said tube, a plurality of contacts adapted to be swept by said devices, there being one row of contacts for each device, means for connecting said predetermined combination of said potentials from said sources to a group of said contacts including the same contact in each row, whereby when said devices reach said same contacts said tube will be caused to conduct, means to drive said devices simultaneously, current sensitive means serially connected to an electrode of said tube, said last named means controlling the operation of said driving means.

2. A telephone switching circuit as claimed in claim 1, wherein said current sensitive means comprises an electromagnetic relay adapted to be energized on discharge of said tube, said relay having a normally closed contact serially connected to said driving means.

3. A stopping circuit for a finder switch having a bank of contacts with several levels, comprising an electronic or ionic discharge tube having a number of electrodes corresponding to the number of said levels and having each electrode connected to the wiper of one of said levels, said tube being capable of conducting at a predetermined combination of potentials, a plurality of sources of different, fixed, electric potentials corresponding to said predetermined combination, means for applying said combination of potentials to particular bank contacts corresponding to a desired azimuth of the finder, driving means for actuation of said finder, and relay means inserted in an electrode connection of said tube and having break contacts in the circuit operating said driving means.

4. A stopping circuit for a finder having three levels of bank contacts, comprising three sources of different, fixed, electric potentials forming a predetermined combination, a safe conduct tube adjusted to discharge at said predetermined combination of potentials and having three electrodes each connected to the wiper of one of said bank levels, means capable of applying said potentials to particular contacts of said three bank levels corresponding to a desired azimuth of the finder in response to the registration of a called office code, a driving means, and relay means inserted in one of the electrode connections of said tube and having its back contacts in series with the power circuit of said driving means.

5. A telephone switching arrangement for controlling a circuit comprising a plurality of sources of different, fixed, electric potentials, an electron discharge tube having a plurality of electrodes, said tube being capable of conducting upon application of a predetermined combination of potentials to the electrodes thereof, a plurality of potential hunting devices, each connected to a different one of the electrodes of said tube, a plurality of contacts adapted to be swept by said devices, there being one row of contacts for each device, means for alternatively connecting to different combinations of contacts of one row the particular potential from said sources which is required for the tube electrode connected to said hunting device cooperating with that row, means for alternatively connecting to other different combinations of contacts of each of the other rows those particular potentials from said sources which are required for the tube electrodes connected to said hunting devices cooperating respectively with those other rows, means to drive said devices simultaneously, and current sensitive means serially connected to an electrode of said tube, said last-named means controlling the operation of said driving means.

6. A telephone switching arrangement, as defined in claim 5, wherein said current sensitive means comprises an electromechanical relay adapted to be energized on discharge of said tube, said relay having a normally closed contact serially connected to said driving means.

CLEMENT M. THEILLAUMAS.

REFERENCES CITED

The following references are of record in the file of this patent:

UNITED STATES PATENTS

| Number | Name | Date |
|---|---|---|
| 2,005,575 | Bowne | June 18, 1935 |
| 2,188,159 | Rockwood | Jan. 23, 1940 |
| 2,295,032 | Deakin | Sept. 8, 1942 |
| 2,358,433 | Wolfner | Sept. 19, 1944 |
| 2,428,024 | Herbig | Sept. 30, 1947 |